(12) United States Patent  
Borissov

(10) Patent No.: US 7,896,746 B2
(45) Date of Patent: Mar. 1, 2011

(54) ADJUSTABLE SUPPORT STAND FOR GAMING DEVICE

(76) Inventor: Milo Borissov, Sharjah Al Durah Tower (AE)

( * ) Notice: Subject to any disclaimer, the term of this patent is extended or adjusted under 35 U.S.C. 154(b) by 738 days.

(21) Appl. No.: 11/897,752

(22) Filed: Aug. 31, 2007

(65) Prior Publication Data
US 2009/0057504 A1    Mar. 5, 2009

(51) Int. Cl.
A63F 13/08    (2006.01)
G07F 17/34    (2006.01)
(52) U.S. Cl. ............... 463/46; 463/20; 273/143 R; 273/309; 273/138.1; 273/138.2
(58) Field of Classification Search ............ 273/143 R, 273/309, 138.1, 138.2; 463/46, 20
See application file for complete search history.

(56) References Cited

U.S. PATENT DOCUMENTS

| | | | |
|---|---|---|---|
| 4,151,804 A * | 5/1979 | Wache et al. ............... | 108/147 |
| 5,044,864 A | 9/1991 | Stefan | |
| 5,232,191 A | 8/1993 | Infanti | |
| D399,670 S | 10/1998 | Miller et al. | |
| 6,116,597 A | 9/2000 | Rowe et al. | |
| 6,637,844 B1 | 10/2003 | Luciano, Jr. et al. | |
| 6,646,695 B1 * | 11/2003 | Gauselmann ............... | 349/58 |
| 6,646,995 B1 | 11/2003 | Le Strat et al. | |
| 6,702,093 B2 | 3/2004 | Lyons et al. | |
| D492,363 S | 6/2004 | Seelig et al. | |
| D492,364 S | 6/2004 | Seelig et al. | |
| D493,846 S | 8/2004 | Seelig et al. | |
| 6,854,715 B2 * | 2/2005 | Hicks et al. ............... | 254/122 |
| 7,040,626 B2 | 5/2006 | Seelig et al. | |
| 2002/0060124 A1 | 5/2002 | Thompson | |
| 2004/0149866 A1 | 8/2004 | Boucher et al. | |
| 2008/0100187 A1 * | 5/2008 | Tomasello et al. ....... | 312/223.6 |

* cited by examiner

*Primary Examiner*—Benjamin H Layno
(74) *Attorney, Agent, or Firm*—Weide & Miller, Ltd.

(57) ABSTRACT

A gaming device support stand is height adjustable, permitting the position of a gaming device positioned thereon to be adjusted. In one embodiment, the support stand comprises a support platform for supporting a gaming device, the support platform movable relative to a base member. A lifting mechanism is used to move the support platform. The lifting mechanism may comprise one or more guide members and one or more force generating mechanisms. A controller may receive player input regarding a desired position of the gaming device. The controller may activate the lift mechanism, thus effectuating movement of the support stand.

20 Claims, 2 Drawing Sheets

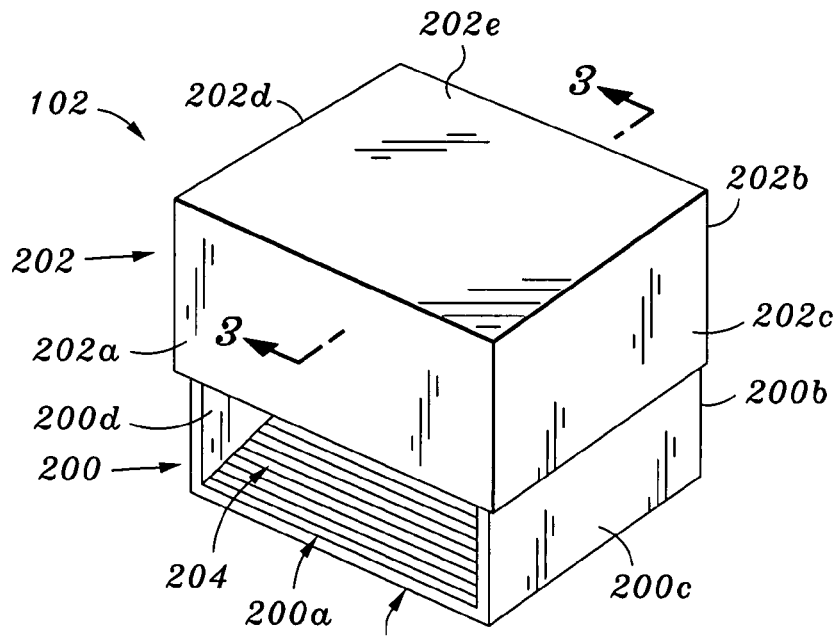
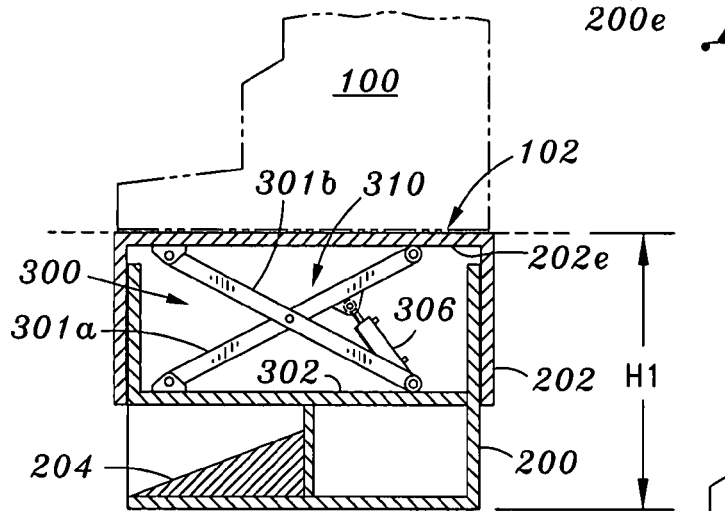
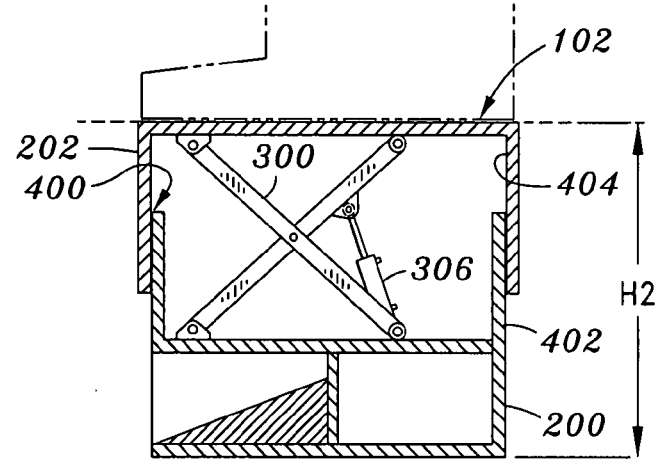

ADJUSTABLE SUPPORT STAND FOR GAMING DEVICE

FIELD OF THE INVENTION

The present invention relates to wagering-type gaming devices. More specifically, the present invention relates to an adjustable support stand for a gaming device.

BACKGROUND OF THE INVENTION

Gaming devices, such as slot machines, video poker machines, and many of the new computerized multi-game devices have become extremely popular in recent times and are commonly the primary attraction for many gaming and entertainment establishments. These gaming devices are typically arranged in banks or groupings to encourage and attract players. As a result, the player may engage in game play by sitting or lounging at the gaming device and the player is typically inclined to play such games for extended periods of time. In some cases, a player may stay at a gaming device for several hours while attempting to win a large jackpot or obtain other cumulative winnings.

Gaming establishments encourage and desire players to participate in the gaming activities for a substantial time period because gaming establishment profitability is directly proportional to the amount of time a player spends gambling in the establishment. In order to promote extended gaming device participation, the player must be provided a comfortable environment in which to play and this is a primary objective of the gaming establishment. During extended time periods of game play, a player generally needs to move or adjust themselves, as they continue to play, and if a comfortable position cannot be found, the player will likely end game play and move on to other activities.

Various measures have been made in attempt to make players more comfortable. For example, instead of forcing players to stand, casinos generally offer players chairs or stools so they may be seated during play. Gaming machines may also include features such as cup holders, ashtrays, footrests or the like, to enhance player comfort.

Still, various features of existing gaming machines render them less comfortable than they otherwise might be. For example, gaming machines are generally manufactured in pre-set configurations. These configurations generally do no address issues such as whether a player is right or left-handed, the height of the player, and similar characteristics.

SUMMARY OF THE INVENTION

The present invention is a height-adjustable gaming device support or "slot" stand and a method of adjusting the height of a gaming device. In one embodiment, the support stand comprises a support surface for supporting a gaming device and a mechanism configured to change the height of the support surface, thereby changing the height of the gaming device.

In one embodiment, the adjustable support stand comprises abase member, a support platform movable relative to the base member, and a lifting mechanism. The base member is configured to support the stand on a support surface, such as a casino floor. The support platform is configured to support at least one gaming device. The lifting mechanism is configured to move the support platform relative to the base member.

The lifting mechanism may comprise at least one guide member and at least one biasing or force generating member or mechanism. In one embodiment, the lifting mechanism might comprise a guide member in the form of scissor arms and a force generating member in the form of at least one hydraulic actuator. The lifting mechanism is configured to move the support platform upward relative to the base member. In one embodiment, the lifting mechanism may also be configured to move the support platform downwardly, while in other embodiments, a return force may be generated by gravity.

In one embodiment, a controller is configured to receive input from a player regarding a desired position for the support stand and associated gaming device. In one embodiment, the controller may comprise a switch having one or more buttons. In other embodiments, the controller may be associated with the gaming device, such as comprising a touch screen of the device or one or more buttons of the gaming device.

In accordance with the invention, the height of a gaming device may be adjusted. In a preferred embodiment, a player may adjust the height of the machine to their own personal preference.

For a fuller understanding of the nature and advantages of the present invention over the prior art, reference should be made to the ensuing detailed description and claims, taken in conjunction with the accompanying drawings.

DESCRIPTION OF THE DRAWINGS

FIG. 2 illustrates a perspective view of the adjustable gaming device support stand illustrated in use in FIG. 1, with the support stand illustrated in a lowered position;

FIG. 3 is a section view of the support stand illustrated in FIG. 2 taken along line 3-3 therein;

FIG. 4 is the sectional view of the support stand illustrated in FIG. 3 illustrating the support stand in a raised position.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have been indicated but not described in detail so as not to obscure the invention.

In general, the invention is a height-adjustable gaming device support or "slot" stand and a method of adjusting the height of a gaming device. In one embodiment, the support stand comprises a support surface for supporting a gaming device and a mechanism configured to change the height of the support surface, thereby changing the height of the gaming device.

Figure 1:
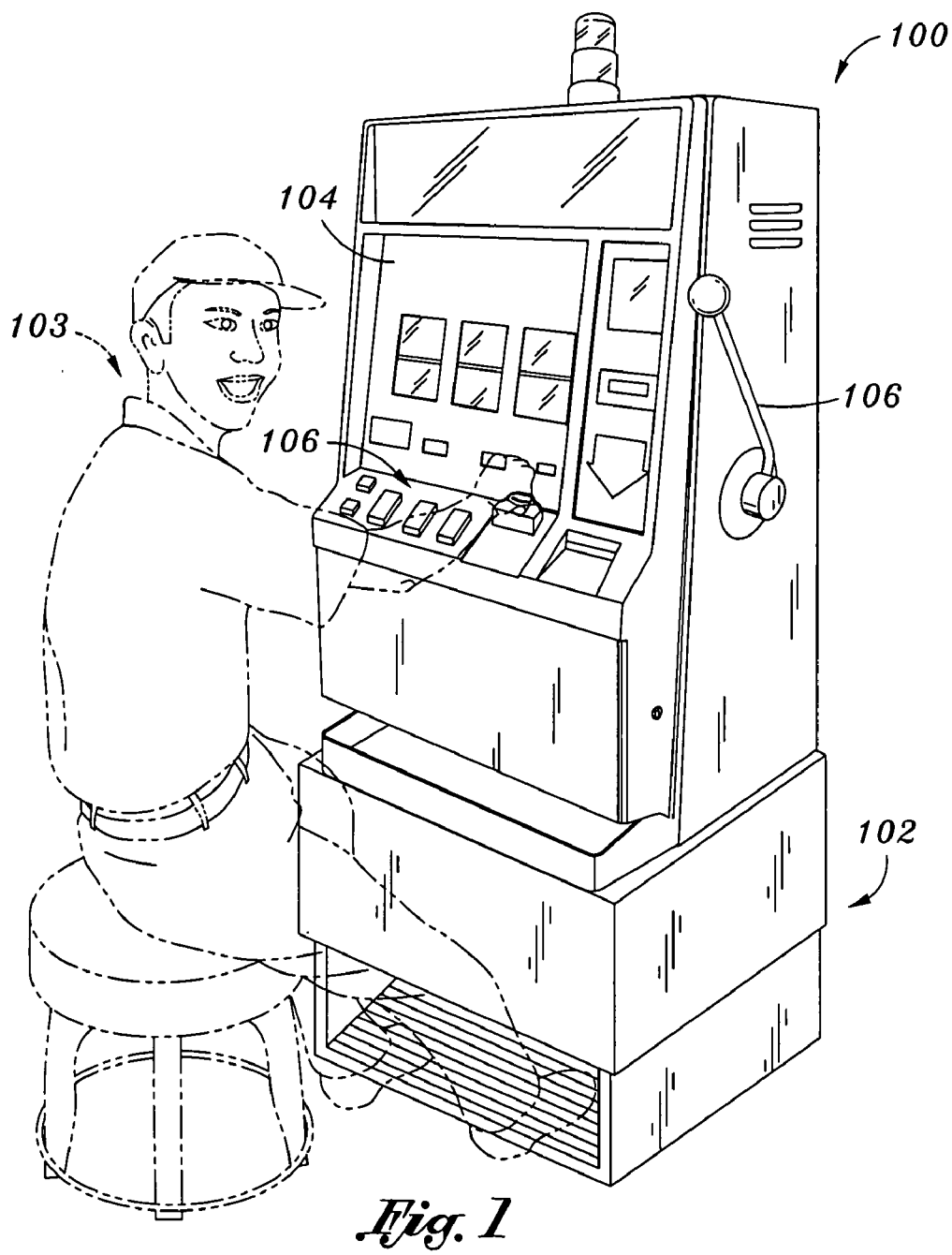
FIG. 1 is a perspective view of a gaming device positioned on an adjustable support stand in accordance with one embodiment of the present invention.

Referring to the figures, FIG. 1 illustrates a gaming device 100 positioned atop an adjustable support or "slot" stand 102 for convenient access by a player 103. In a preferred embodiment, the gaming device 100 is a wager-based gaming device configured to present one or more games to a player for the opportunity of winnings or awards. In one embodiment, the gaming device 100 comprises a housing or cabinet for supporting and/or enclosing various components required for operation of the gaming device. The gaming device 100 preferably includes at least one display device 104. The display device 104 may comprise an electronic video display. The display device 104 could comprise one or more video displays of various types (LCD, CRT, LED, plasma, etc.) or be rotating reels, a wheel or other elements for displaying game information to a player. The gaming device 100 also preferably includes one or more player input devices 106 (such as a touch-screen display, joystick, touch-pad, spin handle, control buttons or the like) that may be utilized by the player to facilitate game play.

In reference to FIG. 2, the support stand 102 comprises a base member 200 and a support platform 202. In one embodiment, the base member 200 has a front 200a, an opposing back 200b, a first side 200c, an opposing second side 200d and a bottom 200e. In one embodiment the front 200a of the primary base member 200 may be configured with an integrally formed foot rest area 204. The foot rest area 204 provides a convenient and comfortable area for the player's feet. As illustrated, the footrest area 204 may be at least partially defined by a bottom portion of the base member 200 (and/or the supporting surface on which the base member 200 is placed) and a interior support 302 (see FIG. 3). In one embodiment, the front 200a, back 200b, and sides 200c,d extend upwardly to a generally open top (see FIG. 3).

In one embodiment, the support platform 202 has a front 202a, an opposing back 202b, a first side 202c, an opposing second side 202d and a top surface 202e. In one embodiment, the front 202a, back 202b and sides 202c,d extend downwardly from the top surface 202e.

In one embodiment, the base member 200 is disposed at least partially within the support platform 202 at one or more times. As illustrated, the support platform 202 may be sized so that the front 202a, back 202b and sides 202c,d extend over the corresponding front 200a, back 200b and sides 200c,d of the base member 200. In this configuration, as best illustrated in FIGS. 3 and 4, the base member 200 and support platform 202 generally define an interior space 310.

In the configuration illustrated, the peripheral shape of the support stand 102 is generally rectangular. However, the support stand 102 may be of other shapes or geometric configurations. In such configurations, the base member 200 and support platform 202 may not have a front, back and opposing sides as described above. For example, the support stand 102 might be generally circular or oval in peripheral shape.

It will also be appreciated that the support stand 102 may have other configurations than as illustrated. Preferably, the support stand 102 has at least one portion for contacting a support surface, as such as the floor of a casino. The support stand 102 also has a second portion which can be moved relative to the support surface. This second portion preferably includes at least a support surface upon which a gaming device may be positioned. Thus, for example, the support platform 202 might be configured to fit at least partially within, rather than partially over, the base member 200. Also, the base member 200 and support platform 202 might not be enclosures. For example, the base member 200 might comprise a legged stand.

Referring to FIG. 3, in a preferred embodiment the support stand 102 includes a means or mechanism for changing the position of the support platform 202 relative to the base member 200. In a preferred embodiment, the height or vertical position of the support platform 202 may be changed relative to the base member 200.

In one embodiment, a lifting mechanism comprises at least one biasing or force generating element and a guide element or mechanism. The biasing or force generating element is configured to generate a raising or lifting (and/or lowering) force. The guide element is configured to control the movement of the support platform 202, such as to constrain its movement to a vertical direction.

In one embodiment, the lifting mechanism comprises a scissor lift 300. The scissor lift 300 preferably includes at least one pair of arms 301a,b which serve as guides and force transmission members. The scissor lift 300 also includes a biasing or force generating element in the form of a hydraulic actuator 306.

In one embodiment, at least a portion of the scissor lift 300 is positioned internally to the support stand 102, such as at the interior space 310. In this manner, the vertical lifting force may be applied between the internal surface/structural element 302 of the base member 200 and the top 202e of the support platform 202. In particular, as illustrated, a first end of each arm 301a,b is connected to the base member 200, and a second end of each arm 301a,b is connected to the support platform 202.

In the embodiment illustrated, the hydraulic actuator 306 is configured to act directly upon the arms 301a,b of the scissor lift 300. However, the hydraulic actuator 306 could be connected at one or both ends to the support stand 102, such as to the structural element 302 of the base member 200 or the top 202e of the support platform 202.

In this configuration, when the hydraulic actuator 306 is activated, it presses the first and second arms 301a,b of the scissor lift 300 apart from one another. This causes the support platform 202 to move upwardly relative to the base member 300. Similarly, when the hydraulic actuator 306 is deactivated or reversed, the support platform moves downwardly relative to the base member 300. In particular, FIG. 3 illustrates the support stand 102 in a first or lowered position. In this position, the height of the top of the support platform 202 relative to the base member 200 is H1. As indicated, the scissor lift 300 may be utilized to raise the support platform 202 relative to the base member 200. As illustrated, this causes the support stand 202 to move to a second or raised position, such as where the height thereof relative to the base member 200 is H2. In the raised position H2, the hydraulic actuator 306 is extended or actuated, thus causing the arms 301a,b of the scissor lift to move apart.

It will be appreciated that the biasing or force generating member and/or the guide member may differ from that illustrated in FIG. 3, and that the scissor lift 300 is just one exemplary embodiment of a lifting mechanism. For example, the biasing or force generating element may be one of several known devices such as a pneumatically powered actuator, a motor driven gear assembly, a screw lift, or a wide variety of other mechanisms now known or later developed. It will be appreciated there may be more than one biasing or force generating member. For example, two or more hydraulic actuators may be utilized to provide the lifting force. In one embodiment, one force generating member may be utilized to move the support platform 202 in a first direction (such as up) and another might be utilized to move the support platform 202 in an opposing direction (such as down).

In one embodiment, the guide member might comprise or include the base member 200 and support platform 202. In particular, portions of the base member 200 and support platform 202 may be utilized to guide the support platform 202. As described above, the front, back and opposing sides of the support platform 202 may extend downwardly over corresponding portions of the base member 200. In this configuration, referring to FIG. 4, an external surface 402 of the base member 202 and the internal surface 404 of the support platform 202 at one or more portions of the overlapping parts of the support platform 202 and base member 200 may be configured to engage one another at one or more times. These inter-engaging surface may define a slide 400 that facilitates the smooth vertical movement of the support platform 202 relative to the base member 200.

In one embodiment, interior and exterior surfaces may comprise a reduced friction material (i.e., Delrin® which is a lightweight, low-friction, and wear-resistant plastic) that is applied to the support platform 202 and base member 200 in these areas. For example, a thin polymer laminate (having a low coefficient of friction) may be applied to each surface.

The guide member might comprise interlocking rails, tongue and groove interlocking members, or other mechanisms configured to guide the movement of the support platform 202 relative to the base member 200. For example, the guide member might be mounted to the external surface 402 of the base member 200 and the internal surface 404 of the support platform 202. In one embodiment, a linear slide is provided, the slide comprising a first slide member fixed or mounted to the external surface 402 of the base member 200 and a second slide member fixed or mounted to the interior surface 404 of the support platform 202. The first and second slide members are connected in a sliding relationship (they may be supported by one or more bearings or the like to facilitate smooth relative movement). The first and second slide members are aligned along their length-wise axes, and are thus configured to move relative to one another along those axes. In this fashion, the slide members permit and facilitate smooth linear movement there between.

The guide member might also comprise one or more wheels mounted to one member and configured to roll along another. For example, one or more wheels might be mounted or embedded within the interior surface 404 of the support platform 202, by which the wheels can move along the exterior surface 402 of the base member 200, or along a track or other element associated therewith.

In one embodiment, the force generating member and guide member may be part of the same mechanism. For example, the force generating member may comprise a screw lift. In this configuration, the guide member may be a head located at the end of the screw and a body of the screw lift. The head might be mounted to the support platform 202 and the body mounted to the base member 200. In this manner, forces generated by the screw lift are guided and transmitted between the base member 200 and support platform 202 so as to cause the support platform 202 to be constrained to substantially vertical movement.

In one embodiment, the gaming device support stand may be configured with an indexing member (not shown) which prevents the unwanted movement of the support platform in the event of biasing element failure. The indexing member provides a means for positional locking of the support platform in a desired position. The indexing member may comprise an indexing surface and mechanism with a locking pawl which holds the indexing member in a desired positional relationship until the locking pawl is released. Once the locking pawl is released the indexing member permits free movement between the indexing surface and the mechanism of the locking pawl. In operation, the locking pawl is disengaged prior to the biasing element moving the support platform, once the platform is in the desired location the locking pawl is re-engaged and the support platform is mechanically locked in position. The locking pawl may be actuated by different means such as either mechanical, electrical or a combination of both.

In one embodiment, the support stand is configured to be generally closed. For example, relative to the support stand 102 illustrated in FIG. 2, the front, back and opposing sides of the support platform 202 overlap the corresponding portions of the base member 200. In this manner, the interior space of the support stand 102, including the scissor lift, are inaccessible to the user. This prevents, for example, body parts or the like from getting between moving portions of the stand and thus getting injured. As illustrated, in the lowered position, the support platform 202 does not extend into the footrest area 204 (see FIG. 3) of the support stand 102. In this manner, lowering of the support platform 202 does not risk injury to a player's feet, even if positioned in the footrest area 204.

In another embodiment, a bellows or similar screening or shielding element might be positioned at the interface of the support platform 202 and the base member 200. The bellows or other member may thus cover the interface in a manner again preventing objects such as fingers or the like from be placed between the moving portions of the base member 200 and support platform 202. For example, the support platform 202 might comprise a generally planar supporting element (with no sides). In this embodiment, the bellows might extend from the periphery of the support platform 202 downwardly to the base member 200.

In one embodiment, the position of the support platform 202 may be changed to essentially an unlimited number of positions between its lowered and raised position. In this manner, the position of the support platform (and thus the gaming device) may be finely adjusted. In other embodiments, the support platform 202 might be configured to be moved to discrete positions, such as a lowered, an intermediate and a raised position.

Figure 5:
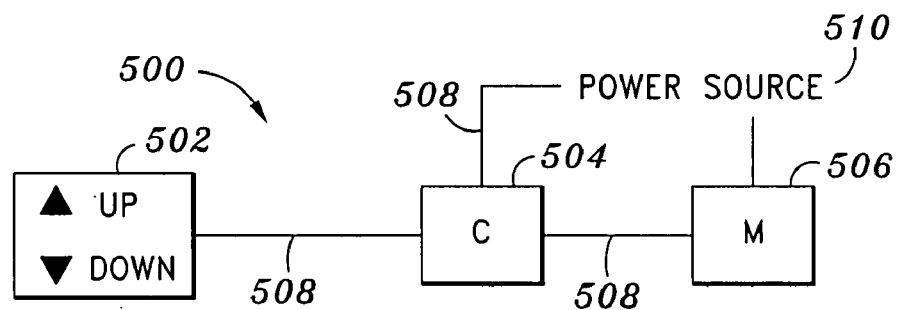
FIG. 5 is schematic for an electronic control circuit for actuation of the support stand.

In one embodiment, the gaming device support stand 102 includes a controller. Preferably, this controller allows a player to selectively control the position of the support stand 102. FIG. 5 illustrates one exemplary control circuit 500. The primary components of this exemplary control circuit are a control switch 502, a motor controller 504 and a motor 506. The control switch 502 is configured to provide power and/or control signals to one or more components of the controller, such as the motor controller 504 and motor 506. The control switch 502 may communicate via one or more electrical/signal conductors 508. In one embodiment, the control switch 502 includes one or more input devices, such as buttons. The control switch 502 might comprise other types of input devices, however, such as a joystick, touch screen display, slide switch or other element configured to receive input a player regarding desired movement or position of the support stand 102.

Relative to the embodiment illustrated in FIG. 3, the motor 506 may comprise the hydraulic actuator 306 (such as a fluid pump thereof). The motor controller 504 may comprise a control unit which is configured to turn the hydraulic actuator 306 (such as the pump) on and off. In this configuration, the control circuit 500 includes a power source 510 to operate the motor controller 504 and motor 506.

In operation, the control circuit 500 provides the control signals and/or electrical power to operate the biasing or force generating element(s) which in turn move the support platform to a player designated position. Of course, the configuration of the controller may vary. For example, in one embodiment the controller might comprise a control switch 502 which simply provides power or does not provide power to a pump, motor or the like.

In one embodiment, the control switch 502 may be mounted in the foot rest 204 region of the support stand (see FIG. 2). In this embodiment, the player actuates the switch by foot to raise or lower the gaming device 100. In an alternate embodiment, the control switch 502 may be incorporated into the player input devices 106 of the gaming device 100 (see FIG. 1), such as by comprising one or more buttons on the button panel. The control switch 502 might also interface with the circuitry of the gaming machine. For example, "raise" and "lower" buttons might be visually indicated on a touch screen display which, when selected, cause the gaming controller of the machine to send appropriate control signals to the lifting mechanism. The control switch 502 might also be located at other portions of the gaming device or even be a wireless controller.

The player may then adjust the positioning of the gaming device while interacting with the player input devices 106 by actuating the control switch 502 located on the gaming device 100. As a result of the location of the control switch 502, the player may easily and conveniently adjust the height of the gaming device in relation to the player's seated height which in turn provides increased comfort and environmental adaptability for the player.

In another embodiment the gaming device support stand 102 includes at least one position sensor (not shown) for measurement and/or indication of the positional relationship between the base member 200 and the support platform 202. It is contemplated that the positional sensor may be one of several now known or later developed measuring devices such as a linear potentiometer, rotary potentiometer, an optical sensor or combinations thereof. The positional information acquired by the position sensor may be communicated to a processing device or computer for use in associating the height of a player adjusted gaming device support stand 102 with a particular player. In this embodiment the height information may be stored or coupled with player tracking information or a player tracking system for subsequent retrieval by a player such that when a player activates the player tracking system the gaming device support stand 102 height is adjusted to the player's preferences. For example, a player may adjust the height of the gaming device support stand, once the stand is in a comfortable position, the player may store the height information on a player tracking card or system. The player may then retrieve the height information at a later date or during a subsequent gaming session. In one variation, the gaming device support stand height may be automatically set, using previously stored height information, upon activation or interaction with the gaming device using the player tracking card.

In use, the support stand 102 is preferably located on a support surface, such as a casino floor. At least one gaming device 100 is located on the support surface, such as the top 202e of the support platform 202, of the support stand 102.

The position of the support surface, and thus the gaming device 200, may be changed. Relative to the embodiment described above, the position of the support platform 202 may be changed relative to the base member 200. Preferably, the support platform 202 can be raised and lowered (i.e. moved at least in a vertical direction). In this manner, the vertical position of the entire gaming device 100 may be changed.

The invention has a number of advantages. Most importantly, the configuration of the gaming device support stand provides increased ergonomic compatibility between the player and the gaming device. The increased ergonomic functionality is by way of the variable height adjustability of the gaming device support stand with respect to the player. Consequently, the player may either raise or lower the gaming device to suit the player's preferences during game play. For example, a tall player may wish to raise the gaming device relative to the floor so that the buttons and other portions of the gaming device are appropriately positioned. Likewise, a shorter player may wish to lower the gaming device. Similarly, a player might change the height or position of the gaming device if they move from a seated to a standing position, or vice versa.

A particular advantage of the invention over previous gaming devices and associated supports is that because a player may arrange the height configuration of the gaming device, player comfort contributes to continued game play for an extended period of time. In particular, because the height of the gaming machine can be adjusted to suit the player's needs, the player's experience will be more enjoyable since the player will be able to find additional comfort zones. Correspondingly, the gaming establishment will enjoy increased profits and revenue generation due to the player's extended game play.

In one embodiment, the control circuit might be coupled to a gaming device controller or other controller so as to receive control signals therefrom. For example, in one embodiment a player might "save" their preferred gaming machine position information with a player account or card. In this manner, when a player uses their card or account, the stored information may be utilized to cause the control circuit to automatically move the support stand 102 to the desired position, thus setting the gaming device 102 at the desired height. In one embodiment, the "height adjustment" feature might even be a premium feature which is only provided to players who sign up with a casino's (or other operator's) player program (i.e. no user controls are provided at the machine or those controls are only enabled if the player activates their card/account.

It is possible for the support stand of the invention to support more than one gaming device. In a preferred embodiment, however, the support stand is configured to support only a single gaming device. In this manner, the player of each gaming device may adjust the specific gaming device that they are playing to their own personal preference.

Although the above provides a full and complete disclosure of the preferred embodiments of the invention, various modifications, alternate constructions and equivalents will occur to those skilled in the art. It will be understood that the above described arrangements of apparatus and the method there from are merely illustrative of applications of the principles of this invention and many other embodiments and modifications may be made without departing from the spirit and scope of the invention. Therefore, the above should not be construed as limiting the invention as defined in the claims.

What is claimed is:

1. In combination a gaming device support stand and a gaming device comprising:
   a base member having a front, an opposing back, a first side, an opposing second side and a bottom;
   a support platform having a front, an opposing back, a first side, an opposing second side and a top surface;
   a lifting mechanism operatively connected between said base member and said support platform, said lifting mechanism comprising at least one force generating device and a guide member, said lifting mechanism configured to vertically raise and lower said support platform relative to said base member; and
   a controller configured to receive input from a player so that the height of said entire gaming device may be varied during use; and a gaming device configured to present a wagering game positioned on said support platform, said controller configured to operate said lifting mechanism in response to said input from said player.

2. The combination in accordance with claim 1 wherein said lifting mechanism comprises a scissor lift and wherein said guide member comprises a pair of arms of said scissor lift and said force generating device comprises at least one hydraulic actuator.

3. The combination in accordance with claim 1 wherein said base member defines a foot rest area.

4. The combination in accordance with claim 1 wherein at least a portion of said support platform extends over at least a portion of said base member.

5. The combination in accordance with claim 1 wherein said lifting mechanism is configured to move said support platform from a lowered position and a raised position relative to said base member.

6. The combination in accordance with claim 1 wherein said controller comprises one more buttons.

7. The combination in accordance with claim 1 wherein said guide member comprises one or more interengaging surfaces of said support platform and base member.

8. In combination:
a height adjustable gaming device support stand, said support stand comprising a base member, a support platform and at least one lifting mechanism configured to move said support platform up and down relative to said base member;
a gaming device configured to present a wagering game positioned on said support platform and
at least one input device configured to receive an input from a player of said gaming device and to send a signal to said at least one lifting mechanism to cause said lifting mechanism to move said support vertically up and down in response to said input from said player, whereby a vertical position of said entire gaming device is changed in response to said input from said player so that the height of said entire gaming device may be varied during use.

9. The combination in accordance with claim 8 wherein said lifting mechanism is positioned between said support platform and said base member.

10. The combination in accordance with claim 9 wherein at least a portion of said support platform extends over at least a portion of said base member and said support platform and base member define a generally enclosed interior space housing said lift mechanism.

11. The combination in accordance with claim 8 wherein said at least one input device is associated with said gaming device.

12. The combination in accordance with claim 11 wherein said at least one input device comprises a touch screen of said gaming device.

13. The combination in accordance with claim 8 wherein said support stand defines an inwardly extending foot recess area and said at least one input device comprises a foot controller located in said foot recess area.

14. The combination in accordance with claim 8 wherein said lifting mechanism comprises at least one guide member and at least one force generating mechanism.

15. A method of utilizing a wagering game device and a support stand comprising:
providing a wagering game device located on a support platform of a support stand;
accepting user input regarding a desired vertical position of said gaming device; and
activating a lifting mechanism to move said support platform of said support stand relative to a base member thereof so that said support platform moves to a position corresponding to said desired vertical position of said gaming device so that the height of said entire gaming device may be varied during use.

16. The method in accordance with claim 15 wherein said step of activating comprises receiving an electronic signal at a controller of said lifting mechanism.

17. The method in accordance with claim 15 wherein said step of accepting user input comprises accepting input at a control switch.

18. The method in accordance with claim 15 wherein said step of accepting user input comprises receiving input at a touch screen of said gaming device.

19. The method in accordance with claim 15 wherein said step of accepting user input comprises receiving instructions stored in association with a player card.

20. The method in accordance with claim 15 wherein said moving step comprises activating an actuator positioned between said base member and support platform.

* * * * *